United States Patent
Tomei et al.

(10) Patent No.: US 11,513,361 B2
(45) Date of Patent: Nov. 29, 2022

(54) APPARATUS AND METHOD FOR FRAME CROPPING AND SHIFTING

(71) Applicant: TEXAS INSTRUMENTS INCORPORATED, Dallas, TX (US)

(72) Inventors: Kevin Ross Tomei, Dallas, TX (US); Jeffrey Matthew Kempf, Dallas, TX (US); Jeffrey Scott Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 193 days.

(21) Appl. No.: 17/008,902

(22) Filed: Sep. 1, 2020

(65) Prior Publication Data

US 2021/0132399 A1 May 6, 2021

Related U.S. Application Data

(60) Provisional application No. 62/928,772, filed on Oct. 31, 2019.

(51) Int. Cl.
*G09G 5/00* (2006.01)
*G02B 27/01* (2006.01)
*G09G 3/20* (2006.01)
*G09G 5/395* (2006.01)
*G09G 5/36* (2006.01)

(52) U.S. Cl.
CPC ..... *G02B 27/0179* (2013.01); *G02B 27/0172* (2013.01); *G09G 3/20* (2013.01); *G09G 5/363* (2013.01); *G09G 5/395* (2013.01); *G02B 2027/014* (2013.01); *G02B 2027/0178* (2013.01); *G09G 2340/0464* (2013.01)

(58) Field of Classification Search
CPC .. G02B 27/0179; G02B 27/0172; G09G 3/20; G09G 5/363
USPC .......................................................... 345/7
See application file for complete search history.

(56) References Cited

U.S. PATENT DOCUMENTS

| | | | |
|---|---|---|---|
| 8,970,495 B1* | 3/2015 | Biffle | G09G 3/003 345/158 |
| 2005/0243100 A1* | 11/2005 | Childers | G09G 3/34 345/589 |
| 2008/0107186 A1* | 5/2008 | Brusnitsyn | H04N 19/139 375/240.28 |
| 2015/0379772 A1* | 12/2015 | Hoffman | G02B 27/0093 345/633 |
| 2019/0339528 A1* | 11/2019 | Freeman | G06F 3/0346 |

\* cited by examiner

*Primary Examiner* — Jonathan M Blancha
(74) *Attorney, Agent, or Firm* — Michelle F. Murray; Charles A. Brill; Frank D. Cimino (57) ABSTRACT

A method includes converting a frame of pixel data to a first frame division unit. The method further includes, responsive to an X,Y coordinate, cropping and shifting the frame division unit to produce a second frame division unit. The method also includes outputting the second frame division unit.

20 Claims, 7 Drawing Sheets

APPARATUS AND METHOD FOR FRAME CROPPING AND SHIFTING

CROSS-REFERENCE TO RELATED APPLICATION

This application claim priority to U.S. Provisional Application No. 62/928,772, filed Oct. 31, 2019, titled "Microsecond X-Y Image Translation," which is hereby incorporated herein by reference in its entirety.

SUMMARY

In one example, a method includes converting a frame of pixel data to a frame division unit. The method further includes, responsive to pixel coordinate cropping and shifting a first frame division unit to produce a second frame division unit. The method also includes outputting the second frame division unit.

In another example, an apparatus includes a frame converter configured to convert video frames to corresponding frame division units. A translation circuit is coupled to the frame converter. The translation circuit has an input and an output. The translation circuit is configured to: responsive to a pixel coordinate, crop and shift a first frame division unit to produce a second frame division unit; and output the second frame division unit.

BRIEF DESCRIPTION OF THE DRAWINGS

For a detailed description of various examples, reference will now be made to the accompanying drawings in which.

DETAILED DESCRIPTION

In augmented reality (AR)/virtual reality (VR) applications, a user with head-worn goggles moves his or her head to view different portions of the images being displayed in the goggles. One or more sensors in the head-worn goggles detect changes to the orientation of the user's head position and thus the user's field of view. A graphics processor unit (GPU) receives signals from the sensors and calculates a frame of pixel data relative to the user's current field of view to be shown on displays built into the AR/VR goggles. The rate at which video content can be updated is limited to the frame rate (also referred to as the rendering speed) of the GPU.

The described examples are directed to allowing updates to the image content being displayed during a rendered video frame interval on a frame division unit (explained below) basis. Examples of a frame division unit include bit-planes and sub-frames which are further explained below. An observation window includes a subset of all of the pixel values of the rendered frame. The observation window pixels are displayed on a display device within, for example, a head-worn display. A detected movement of the head-worn display during the rendered frame interval causes a corresponding "shift" of the observation window within the rendered frame. As a result of the shift of the observation window, the image content being displayed also shifts.

Figure 1A:
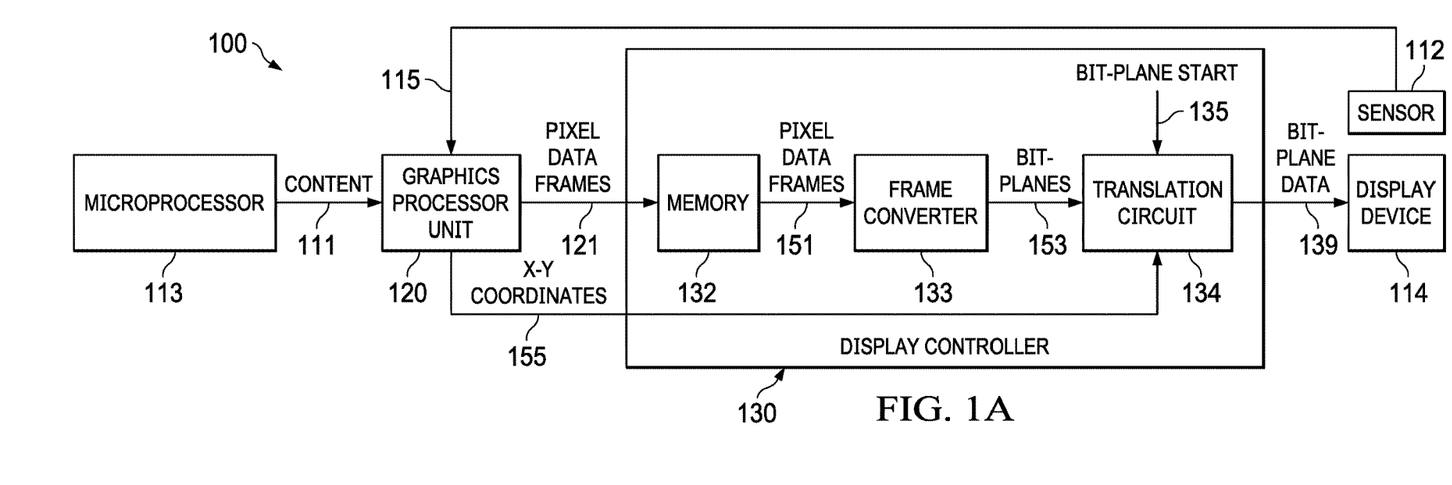
FIG. 1A illustrates an example of a display system including an translation circuit.

FIG. 1A shows an example display system 100. The display system 100 may be implemented as a head-worn device. As shown, the display system 100 includes a sensor 112, a display device 114, a graphics processor unit (GPU) 120, and a display controller 130. The display system 100 may be an augment reality/virtual reality (AR/VR) headset which may include a separate display device 114 for each eye of the user. The display device 114 comprises any suitable type of display mechanism such as a digital micromirror display (DMD), a liquid crystal on silicon (LCOS) display, a micro light emitting diode (microLED) display, etc. The sensor 112 may comprise one or more accelerometers and may detect the orientation/direction of the user's field of view. The sensor 112 sends a sensor signal 115 to the GPU. The GPU 120 receives data 111 indicative of content to be displayed on the display device 114 and renders individual frames 121 of pixel data. The content 111 is generated by, for example, a microprocessor 113 executing software (e.g., a video game). The rendering process performed by the GPU generates the color values (e.g., red, green, and blue) for each pixel in the frame. The rendering process may involve the application of texture or other types of visual effects to the content to be displayed. The GPU provides the pixel data frames to the display controller 130 and the pixel data frames 121 are stored in memory 132 within or coupled to the display controller. The GPU 120 updates the pixel data frames 121 based on the content and the sensor signal 115 which indicates the user's field of view. The rate at which the GPU 120 updates the pixel data frames 121 in response to changes in the content and the sensor signal 115 is bound by its rendering speed (frame rate).

The display controller 130 reads the pixel data frames (labeled as pixel data frames 151) from the memory 132 and converts the pixel data frames 151 to bit-planes 153 to be displayed on the display device 114. The display controller 130 includes a frame converter 133 and a translation circuit 134. The frame converter 133 retrieves the pixel data frames 151 from the memory 132 and converts the pixel data frames 151 to frame division units. In one example implementation, the frame converter 133 includes a digital circuit including, for example, logic gates, registers, flip-flops, etc. As noted above, one example of a frame division unit is a bit-plane. A frame includes an array of pixel color values. For example, each pixel includes a red value, a green value, and a blue value. Each color value includes multiple bits (e.g., 8 bits). A bit-plane is the bit values for the same bit position for a given color across the array of pixels. For example, all of bit number 2s of the red pixel values for a given frame is one bit-plane. In the example in which each of the three colors is represented by 8 bits in a frame, there are 24 bit-planes for the frame (8 bit-planes for red, 8 bit-planes for green, and 8 bit-planes for blue). Another example of a frame division unit is a sub-frame. A sub-frame is any partition of the original rendered frame supplied by the GPU that can be displayed one or more times during the GPU's frame interval in conjunction with other sub-frames to form the final image on the display device. The discussion below references bit-planes but the examples apply to other types of frame division units.

The translation circuit 134 processes the bit-planes 153 from the frame converter 133 and provides the resulting processed bit-plane data 139 to the display device 114. Further and as explained below, the translation circuit 134 shifts an observation window within the individual bit-planes based on a new pixel coordinate (e.g., an X,Y coordinate) 155 provided to the translation circuit 134 by the GPU 120 (which itself determines based on the sensor signal 115 from sensor 112). In an example, the GPU 120 sends new XY coordinates without sending a new data frame. The display device 114 receives the bit-plane data 139 and produces images based on such data.

Figure 9:
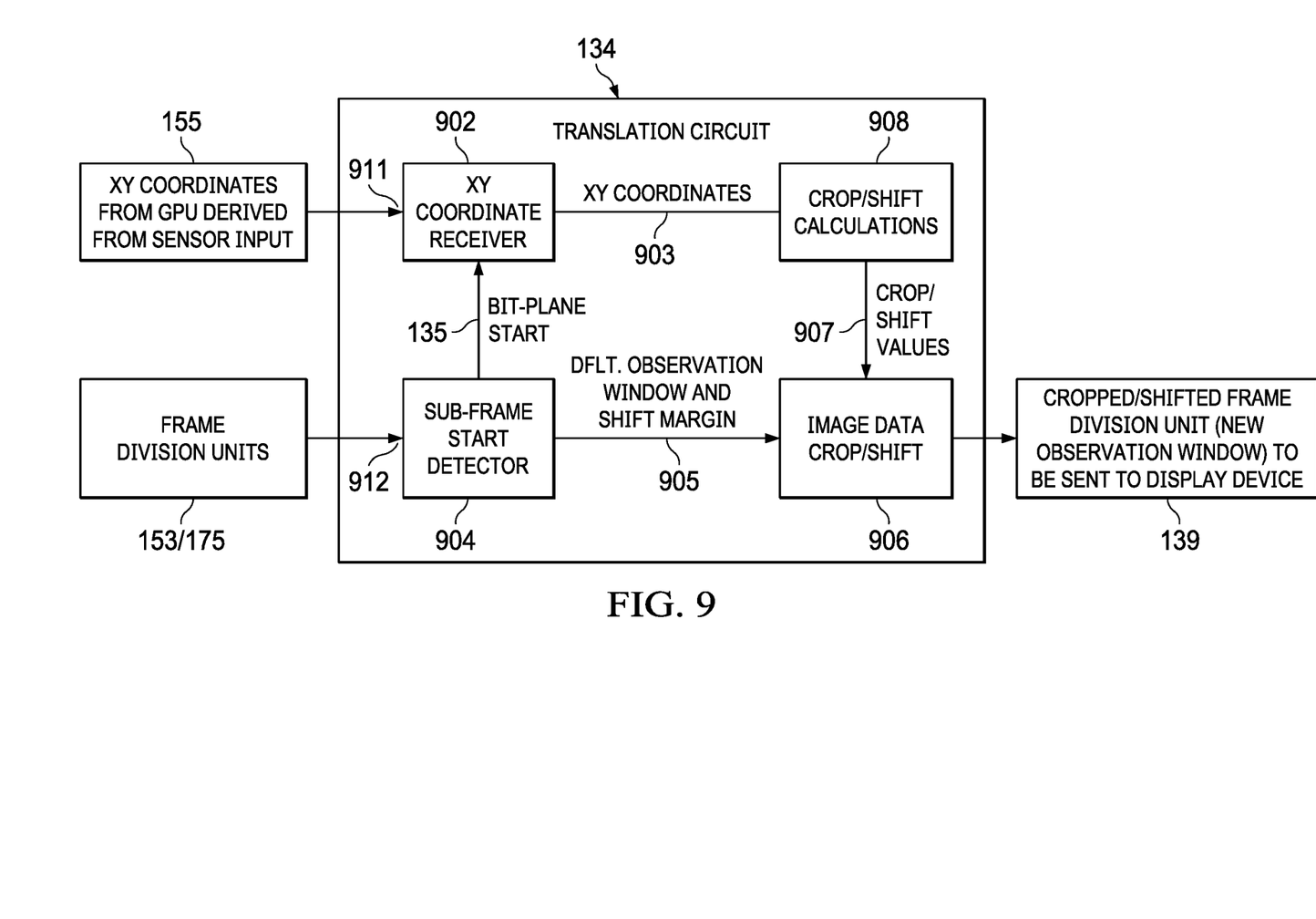
FIG. 9 shows an example of the translation circuit.

The translation circuit 134 may include a digital circuit synthesized using a circuit synthesization tool based on the disclosed functionality attributed to it. In another implementation, the translation circuit 134 includes a hardware processor executing firmware to perform the described functionality. An example implementation of the translation circuit is shown in FIG. 9 and described below.

Figure 1B:
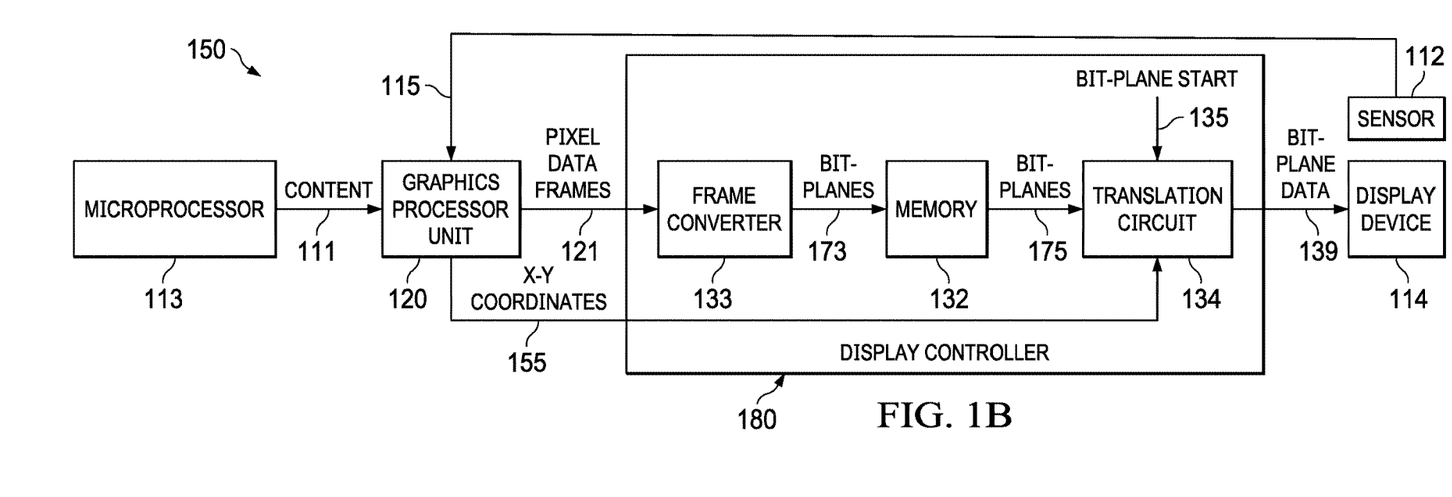
FIG. 1B illustrates another example of a display system with an translation circuit.

FIG. 1B shows another example of a display system 150. Display system 150 is architecturally similar to display system 100 of FIG. 1A. A difference between display systems 100 and 150 is that, for display system 150, the input of the frame converter 133 is coupled to the output of the GPU 120, and the output of the frame converter 133 is coupled to memory 132. As such, the pixel data frames 121 from the GPU 120 are provided to the frame converter 133, which converts the pixel data frames 121 to bit-planes 173 for storage in memory 132. The translation circuit 134 then processes the bit-planes 175 from memory 132 as described herein.

Each pixel within a rendered frame includes one or more components of, for example, red, green, and blue—with each color component including multiple bits (e.g., 8 bits). Each color within a rendered frame includes multiple bit-planes. A bit plane for a given color includes the bit value for a corresponding bit across all of the pixels within a given rendered frame. For example, for an 8-bit RGB representation (i.e., 8 bits for red, 8 bits for green, and 8 bits for blue), red comprises 8 bit-planes within a single rendered frame. One bit-plane includes the bit values of bit [0] for each red pixel value across the rendered frame. Another bit-plane includes the bit values of bit [1] for each red pixel value across the rendered frame, and so on. In the same way, there are also 8 blue bit-planes and 8 green bit-planes. The translation circuit 134 operates on the individual bit-planes (or other types of frame division units such as sub-frames).

Multiple bit-planes are displayed for each frame and thus multiple bit-planes are displayed for the given frame rate and are integrated over time by the user's sensory system (eyes/brain) to form the final image being seen by the observer. The XY translation circuit 134 performs shifts on individual bit-planes rather than entire frames. As the sensor 112 detects a change in the user's head position or orientation, the bit-plane(s) for the currently displayed frame can be shifted before the next frame is available for processing by the display controller. As such, the display system 100 advantageously permits shift updates to occur at the faster bit-plane rate than the slower GPU frame rate. As such, the display system 100 achieves a faster rate of shift updates on the displayed image without the power penalty of running the GPU at a faster rendering speed/frame rate.

Figure 2:
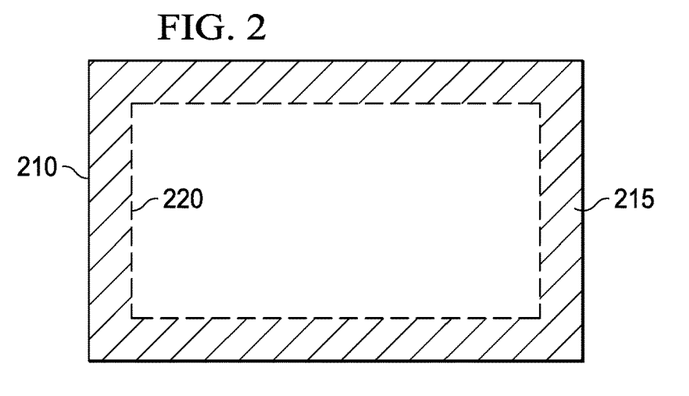
FIG. 2 illustrates the relationship between a rendered frame and an observation window within the rendered frame.

FIG. 2 illustrates an observation window 220 within a rendered frame 210. The observation window 220 defines that portion of the rendered frame 210 that is displayed on display device 114. The rendered frame 210 is generated by the GPU 120 and stored in the display controller's memory 132. In one example, the rendered frame includes an array of pixels. Each pixel is represented by three color values (e.g., red (R), green (G), and blue (B)). Each color value includes a set of bits. In one example, each pixel comprises an 8-bit red value, an 8-bit green value, and an 8-bit blue value, which can be displayed sequentially at a sufficiently fast rate that the human eye and brain integrates the flashing pixel colors into any of numerous desired colors. Any of numerous colors can be created through combinations of pairs of red, green, or blue.

The observation window 220 is smaller than the rendered frame meaning that the observation window 220 includes a subset of all of the pixel data of the rendered frame. FIG. 2 illustrates the observation window 220 at an example location, which is centered within the rendered frame 210. The margin 215 within the rendered frame 210 includes pixel data that are outside the default location of the observation window 220 and thus are not shown on display device 114 unless the user moves his/her head. When the sensor 112 detects a movement of the field of view of the user, a new XY coordinate is sent from the GPU 120 to the translation circuit 134 which responds by shifting the observation window in the direction of the change in field of view of the user. When the observation window 220 is shifted, some of the pixels within the margin 215 are displayed on the display device 114 while some pixels in the default observation window are dropped.

Figure 3:
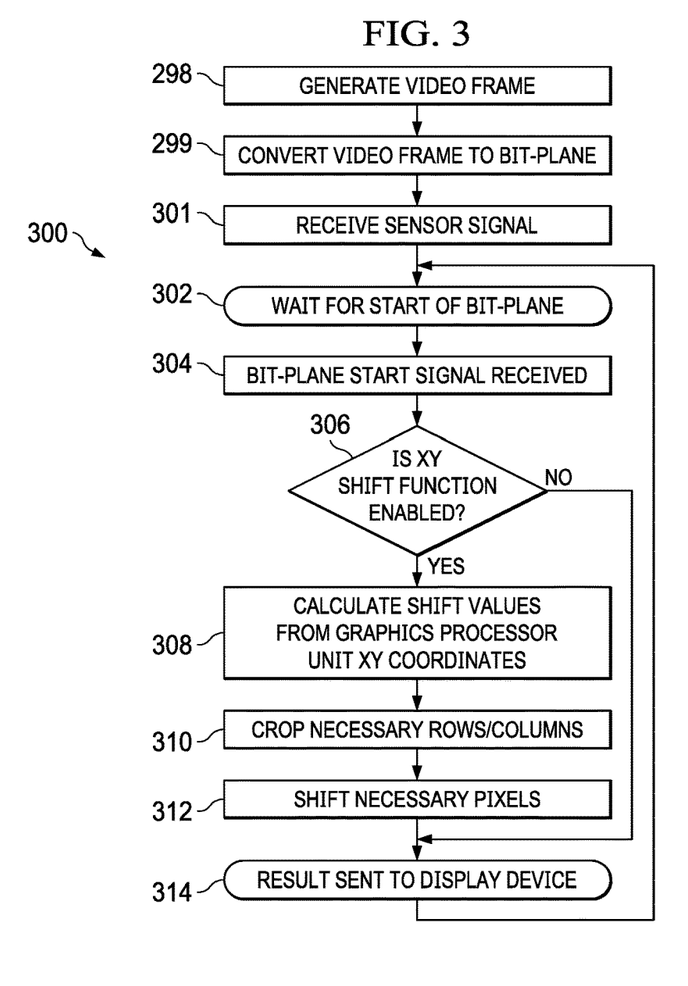
FIG. 3 illustrates an example flowchart of a method for cropping and shifting individual bit-planes of a rendered frame.

FIG. 3 illustrates a flowchart 300 illustrating a method implemented by either display systems 100 or 150. At block 298 the method includes generating a video frame. This operation may be performed by, for example, microprocessor 113 as explained above. At block 299, the method includes converting (e.g., by the frame converter 133) the video frame to a bit-plane, or other type of frame division unit. A sensor signal may be received (as indicated by block 301) indicating the pixel bit-plane should be cropped and shifted.

At block 302, the translation circuit 134 waits for the start of the bit-plane. The start of the bit-plane is indicated by a bit-plane start signal 135, (FIGS. 1A and 1B) which is generated by the display controller 130 and is asserted before the first piece of bit-plane data is provided to the translation circuit 134 for processing. Bit-plane start signal 135 notifies the translation circuit 134 to re-initialize its logic to prepare for each newly input bit-plane. At block 304, the bit-plane start signal is received by the translation circuit 134.

At block 306, the translation circuit 134 determines whether its shift function is enabled or disabled. In one implementation, the display controller 130 is programmable to perform the disclosed bit-plane shift functionality by, for example, writing a programmable value to a corresponding configuration register. If the shift function has not been enabled, then control flows to block 314 in which the non-shifted bit-plane is provided to the display device 114 for display thereon.

However, if the shift function has been enabled, then at block 308, the method includes calculating shift values from the XY coordinate provided by the GPU 120. An example process for how shift values are calculated is described below. At block 310, certain rows and/or columns within the bit-plane are cropped based on the calculated shift values, and the remaining (uncropped) bits of the bit-plane are shifted at block 312 based on the shift values. The resulting cropped and shifted bit-plane is then sent to the display 114 for display thereon.

Figure 4:
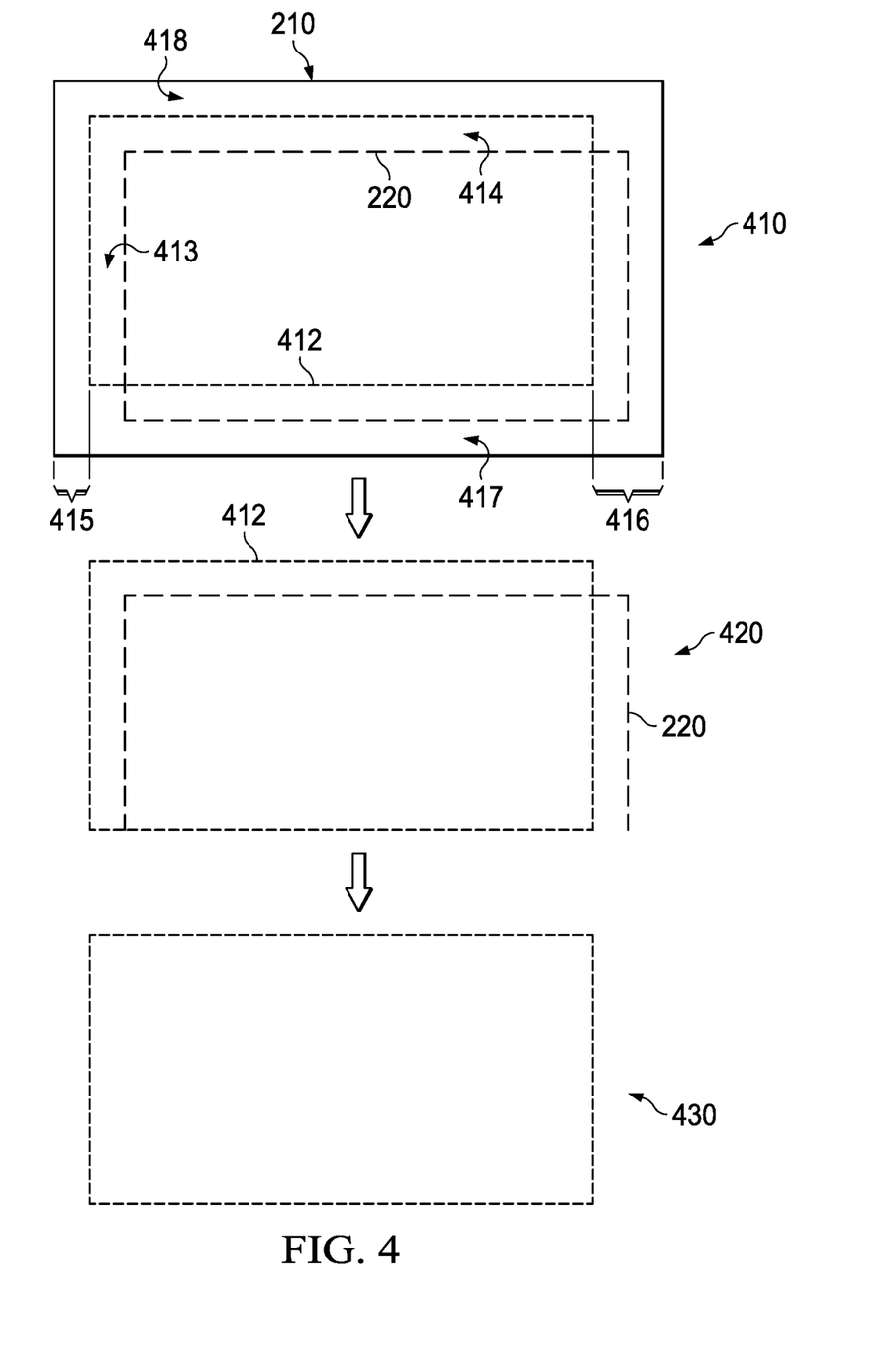
FIG. 4 further illustrates the cropping and shifting operation.

FIG. 4 illustrates the process of cropping and shifting a bit-plane per operations 310 and 312 of method 300 of FIG. 3. The original rendered frame 210 from the GPU 120 is shown at view 410. The default position of the observation window 220 also is shown centered within the rendered frame 210. In this example, the user's head and thus the field of view has moved up and to the left thereby resulting in a shift of the observation window 220 to a new observation window 412. The new observation window 412 now includes most, but not all, of the pixels from the default observation window 220 along with pixels 413 and 414 of the margin 215 that now fall within the new observation window 412.

The bit-plane columns 415 and 416 and rows 417 and 418 outside the new observation window 412 are cropped (e.g., deleted, marked to be ignored, etc.) per block 310 in FIG. 3. The resulting bit-plane after cropping the rows 417 and 418 is shown at view 420, and the bit-plane after cropping columns 415 and 416 is shown at view 430. The resulting cropped bit-plane data 430 is now mapped to the supplied XY coordinates and is sent to the display device 114.

Figure 5:
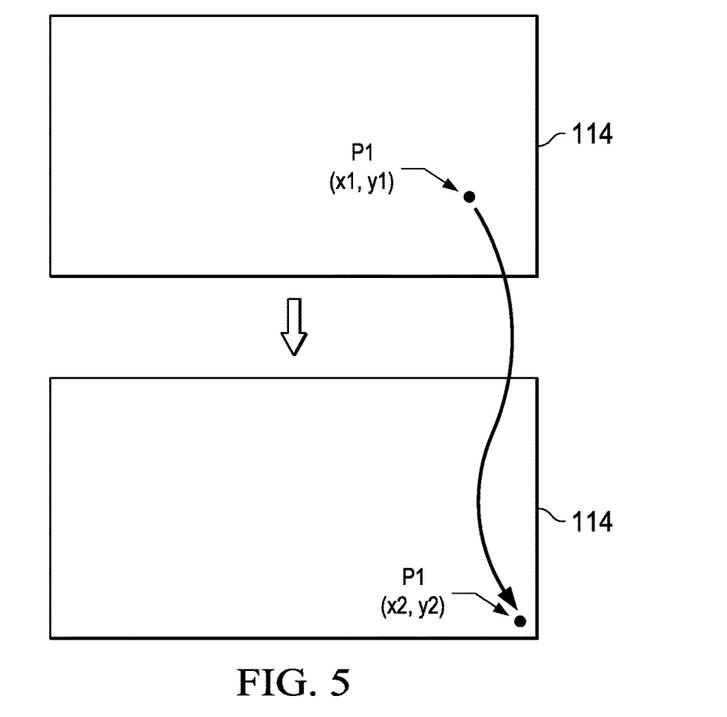
FIG. 5 illustrates the shifting of bit-plane from one observation window to another.

FIG. 5 illustrates this shift operation. The pixels of the display 114 are shown identifying one pixel P1 for illustration purposes. Before the shift, P1 has display coordinates (X1,Y1 ). The user's field of view shifts up and, as such, P1 is shifted down and to the right to new coordinates (X2,Y2). Referring back to FIG. 4, the bit-plane following the cropping and shifting operations (430) is provided to the display device 114. The XY shift of the pixels is thus calculated based on the field of view shift determined by GPU 120 based on the sensor signal 115 from the display system 100. Upon the start of a new rendered frame from the GPU, the observation window initializes to its default (e.g., centered position) for the new rendered frame.

Figure 6:
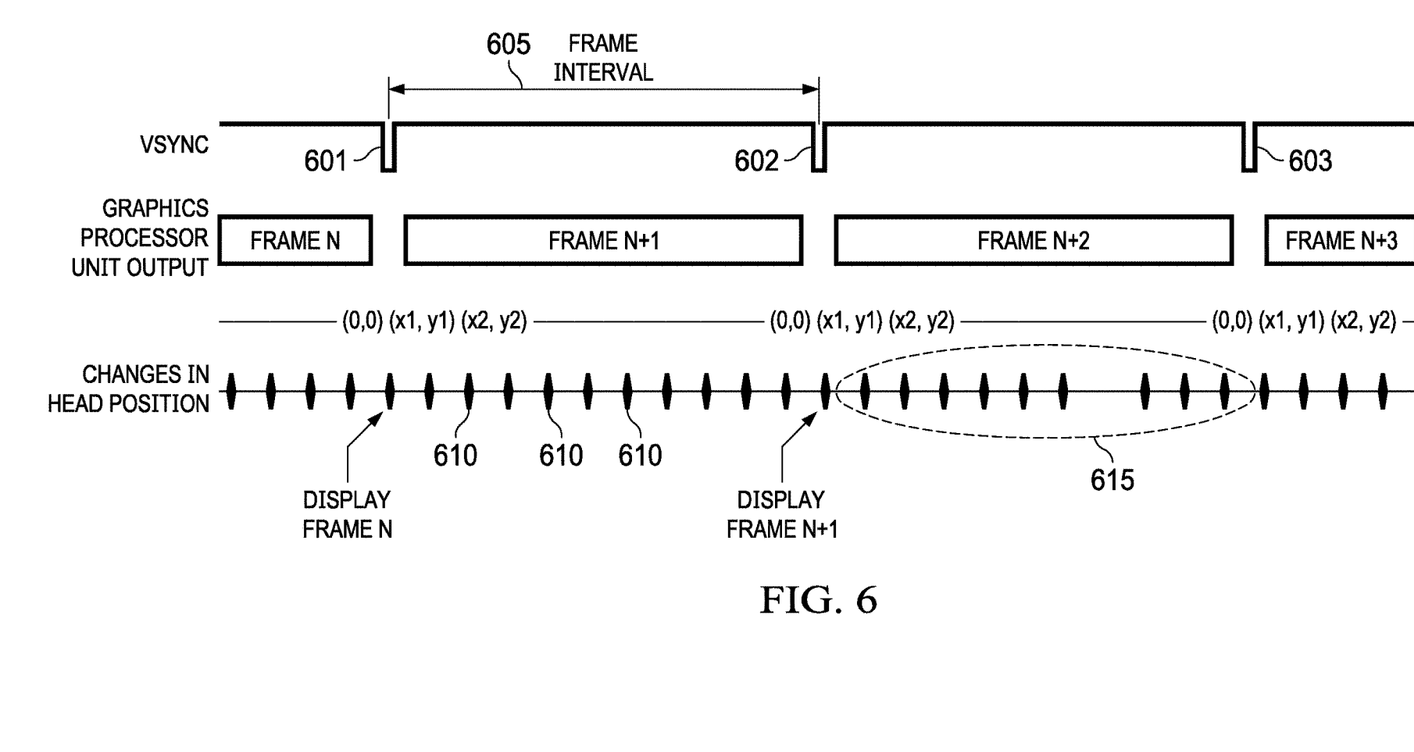
FIG. 6 illustrates the translation circuit implementing changes to the displayed image within a rendered frame interval.

The method 300 of FIG. 3 and as further illustrated in FIG. 5 implements changes to the displayed content during a frame interval as illustrated in FIG. 6. FIG. 6 shows a time sequence of rendered frames N, N+1, N+2, and N+3 as computed by GPU 120. The beginning of each rendered frame is preceded by a VSYNC pulse as shown at 601, 602, 603. The frame interval is the time between VSYNC pulses as show at 605.

During a frame interval 605, the GPU 120 determines changes to the field of view (based on sensor signal 115) at discrete time intervals (e.g., 10 times per frame interval 605) as indicated at 610. If the GPU detects a change in the user's field of view during a frame interval, the method 300 of FIG. 3 is performed by the translation circuit 134 to crop and shift one or more of the constituent bit-planes including the corresponding rendered frame. As such, updates to the displayed image can be made during any given frame interval (e.g., as illustrated at 615).

Figure 7:
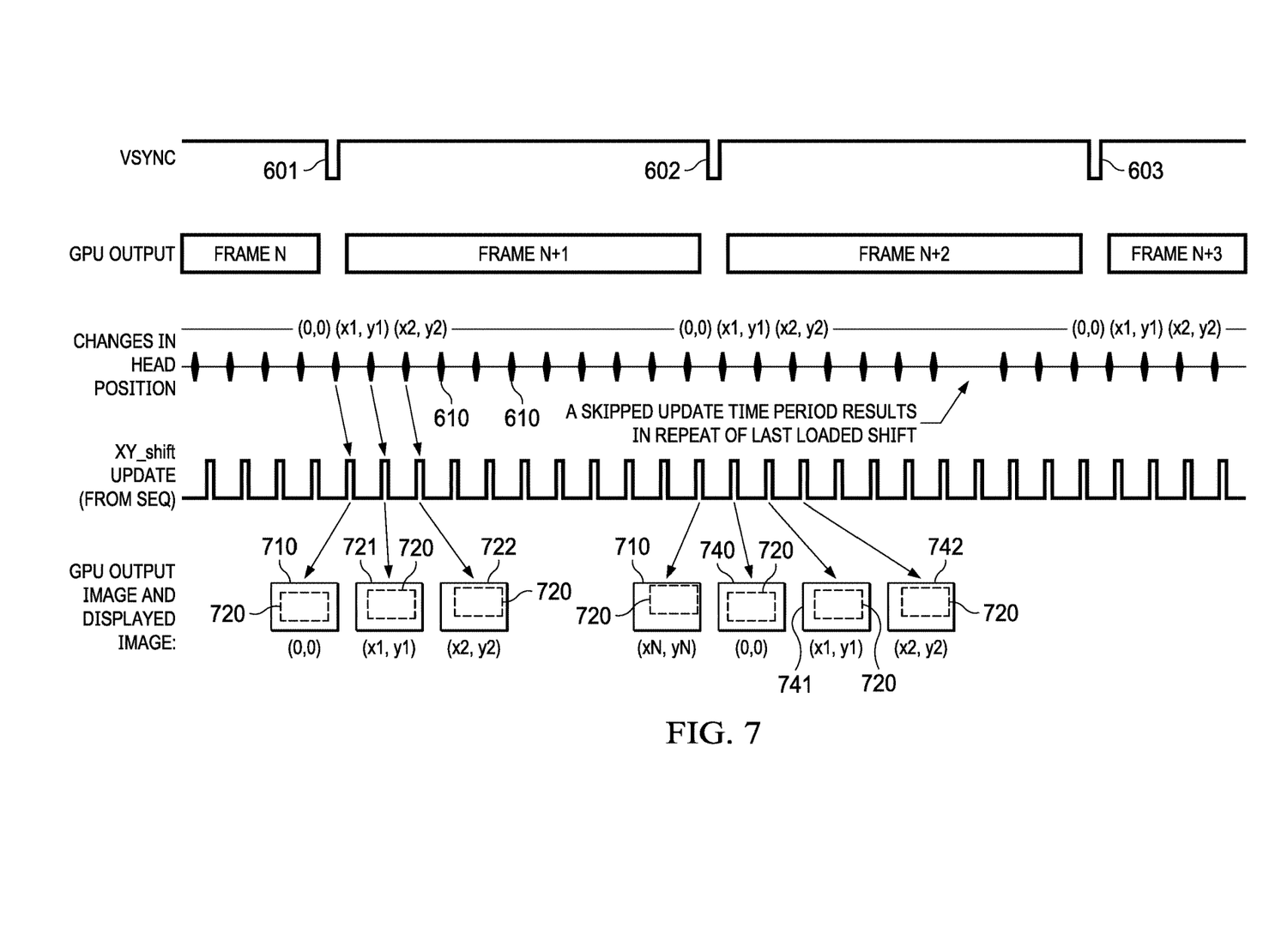
FIG. 7 further illustrates the translation circuit implementing changes to the displayed image within a rendered frame interval

FIG. 7 also illustrates the time sequence of rendered frames N, N+1, N+2, and N+3 as computed by GPU 120. Reference numeral 710 identifies the boundaries of each rendered frame, and reference numerals 720 and 740 identify the observation window within each frame. As reflected by reference numerals 721 and 722, the observation window 720 has shifted up and the right within the frame 710 as a result of a detected change (by sensor 112) in the user's gaze. Frame 740 is the subsequent frame N+2 and the observation window 720 is, in this example, reset to the center of the new frame 740. As reflected by reference numerals 741 and 742, the observation window 720 again has shifted up and the right within the frame 710 as a result of a detected change (by sensor 112) in the user's gaze. The observation window 720 may or may not be reset to the center of each new rendered frame. FIG. 7 also illustrates a skipped update time period. When that happens, the previous shifted pixel bit-plane is reused.

Figure 8:
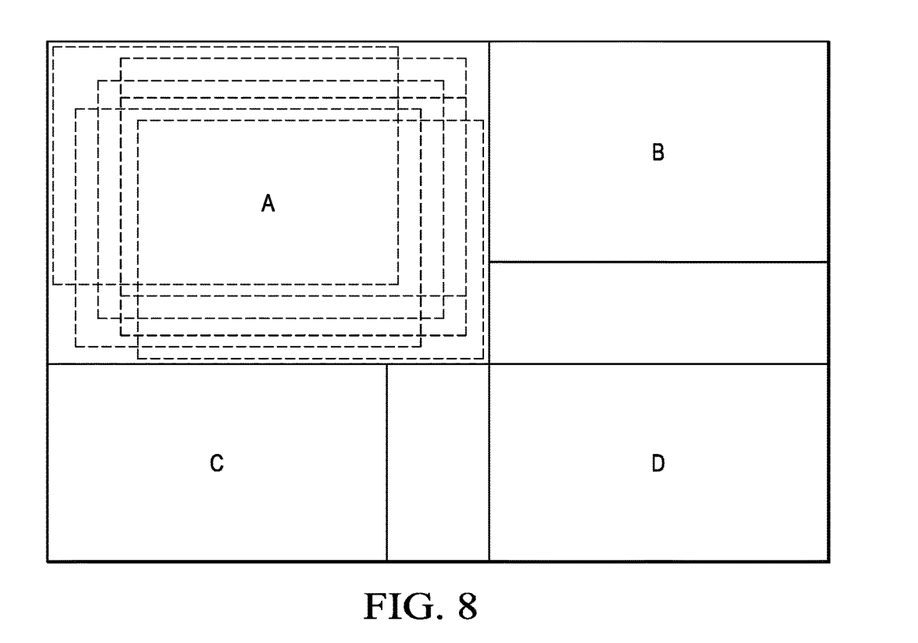
FIG. 8 illustrates the XY shifting process being performed on individual partitions of a multi-partition image.

FIG. 8 illustrate the display controller 130 generating an image comprising multiple partitions, such as partitions A, B, C, and D. Further, the XY translation functionality performed by the translation circuit 134 can be performed with each individual partition, and the resulting cropped and shifted bit-planes can be joined to form a final translated image.

FIG. 9 shows an example implementation of the translation circuit 134. The translation circuit 134 in this example includes an XY coordinate receiver 902, a sub-frame start detector 904, an image data crop/shift circuit 906, and crop/shift calculation circuit 908. The XY coordinate receiver 902, a sub-frame start detector 904, an image data crop/shift circuit 906, and crop/shift calculation circuit 908 may comprise digital circuits including logic gates, flip-flops, registers, and the like. The sub-frame start detector 904 has an input 912 over which is received the frame division units 153/175 from the frame converter 133 or memory 132 as described above. Upon receipt of a frame division unit, the sub-frame start detector 904 asserts the bit-plane start signal 135 to the coordinate receiver 902. The XY coordinate receiver 902 has an input 911 over which is received the XY coordinates 155 from the GPU 120. The XY coordinate receiver 911 is coupled to the crop/shift calculations circuit 908 and provides the received XY coordinates (shown as signals 903) to the crop/shift calculations circuit 908. The sub-frame start detector 904 also generates and provides data 905 indicative of the default observation window (e.g., observation window 220) and shift margin 215. The data 905 may include XY coordinates defining the boundaries of the default observation window and the shift margin. Crop/shift calculations circuit 909 generates hardware crop/shift values 907 that it derives from the XY coordinates 903, and the image data crop/shift circuit 906 crops and shifts the frame division unit as described above based on the hardware crop/shift values 907 and the data 905, and outputs the resulting cropped and shifted frame division unit 139 to be sent to the display device.

In one application, and as explained above, the sensor 112 is included within head-worn goggles (e.g., AR/VR) and is operative to track movement of the user's head. In another example, the sensor is attached to, or otherwise part of, a display device such as a projector. The sensor in this latter case may be an accelerometer and is operative to track unintentional and undesirable vibrations or jostling of the display device in order to stabilize the image being displayed. The technique employed to stabilize an image produced by a display device is the process described above. The display device can be a display device within a mobile communication device such as a cellular telephone. Whether the image is to be shifted as a result of an AR/VR user moving his or her head to attempt to view previously undisplayed portions of an image or whether the image is shifted to account for unintentional display device movement, the disclosed processing of the frame division units is the same.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method, comprising:
   receiving, by a frame converter, a frame of pixel data;
   converting, by the frame converter, the frame to a first bit-plane;
   receiving, by a translation circuit, a pixel coordinate;
   cropping and shifting, by the translation circuit, the first bit-plane, based on the pixel coordinate to produce a second bit-plane; and
   outputting, by the translation circuit, the second bit-plane.

2. The method of claim 1, wherein outputting the second bit-plane comprises outputting the second bit-plane to a display device, the display device being a digital micromirror device (DMD) display, a liquid crystal on silicon (LCOS) display, or a micro-light emitting diode (microLED) display.

3. The method of claim 1, wherein receiving the pixel coordinate comprises receiving the pixel coordinate from a sensor, the sensor being a sensor of a display device.

4. The method of claim 1, further comprising generating, by a graphics processor unit, video frames at a frame interval, and the cropping and shifting the first bit-plane occurring in less than the frame interval.

5. An apparatus, comprising:
   a frame converter configured to receive, video frames, convert the video frames to corresponding first bit-planes, and output the first bit-planes; and
   a translation circuit coupled to the frame converter, the translation circuit configured to:
   receive the frame division units first bit-planes;
   receive a pixel coordinate;
   crop and shift the first bit-planes based on the pixel coordinate to produce second bit-planes; and
   output the second bit-plane.

6. The apparatus of claim 5, further comprising a display device coupled to the translation circuit, wherein the display device comprises a digital micromirror device (DMD) display, a liquid crystal on silicon display (LCOS), or a micro-light emitting diode (microLED) display.

7. The apparatus of claim 5, further including a sensor, and wherein the apparatus is a head-worn device, and the sensor is a sensor within the head-worn device.

8. The apparatus of claim 5, further comprising a sensor, and wherein the apparatus is a projector, and the sensor is a sensor of the projector, and the sensor is configured to determine orientation of a head-worn goggles.

9. The apparatus of claim 5, further including an accelerometer, and the pixel coordinate is based on a signal from the accelerometer.

10. The apparatus of claim 5, wherein the video frames have a frame rate and the translation circuit is configured to shift the first bit-planes at a rate that that is higher than the frame rate.

11. The apparatus of claim 5, further comprising memory coupled to the frame converter, the memory configured to store the video frames and the frame converter configured to retrieve the video frames from the memory.

12. The apparatus of claim 5, further comprising memory coupled to the frame converter and to the translation circuit, the memory configured to store the first bit-planes from the frame converter, and the translation circuit configured to retrieve the first bit-planes from the memory.

13. An apparatus, comprising:
   a graphics processor unit (GPU) configured to generate video frames;
   a sensor coupled the GPU, the sensor configured to produce a sensor signal, the GPU configured to produce pixel coordinates based on the sensor signal;
   a frame converter coupled to the GPU, the frame converter configured to convert video frames to corresponding first bit-planes;
   a display device;
   a translation circuit coupled to the frame converter, to the GPU, and to the display device, the translation circuit configured to:
   receive the pixel coordinates;
   crop and shift the first bit-planes based on the pixel coordinates to produce second bit-planes; and
   output the second bit-planes to the display device.

14. The apparatus of claim 13, wherein the video frames have a frame rate and the translation circuit is configured to crop and shift the first bit-planes at a rate that that is higher than the frame rate.

15. The apparatus of claim 13, wherein the apparatus is a virtual reality or an augmented reality head-worn apparatus.

16. The apparatus of claim 13, wherein the sensor is a sensor within a head-worn display.

17. The apparatus of claim 13, wherein the sensor is an accelerometer.

18. The apparatus of claim 13, wherein the sensor is configured to produce the sensor signal responsive to change in orientation of a head-worn display.

19. The apparatus of claim 13, further comprising memory coupled to the GPU and to the frame converter, the memory configured to store the video frames and the frame converter configured to retrieve the video frames from the memory.

20. The apparatus of claim 13, further comprising memory coupled to the frame converter and to the translation circuit, the memory configured to store the first bit-planes from the frame converter, and the translation circuit configured to retrieve the first bit-planes from the memory.

* * * * *